United States Patent [19]
Sakamoto

[11] Patent Number: 5,851,074
[45] Date of Patent: Dec. 22, 1998

[54] ROLLING BEARING UNIT WITH ROTATING SPEED DETECTOR

[75] Inventor: Junshi Sakamoto, Fujisawa, Japan

[73] Assignee: NSK, Ltd., Tokyo, Japan

[21] Appl. No.: 974,151

[22] Filed: Nov. 19, 1997

Related U.S. Application Data

[63] Continuation of Ser. No. 554,792, Nov. 7, 1995, abandoned.

[30] Foreign Application Priority Data

Nov. 7, 1994 [JP] Japan ................................. 6-272614

[51] Int. Cl.$^6$ ...................................................... F16C 19/28
[52] U.S. Cl. ............................................................. 384/448
[58] Field of Search ..................... 384/448, 446, 384/544; 324/174, 173

[56] References Cited

U.S. PATENT DOCUMENTS 4,986,605  1/1991  Descombes .

5,296,805  3/1994  Clark et al. .............................. 384/448

FOREIGN PATENT DOCUMENTS 7-55825   8/1993  Japan .
6-82569  11/1994  Japan .

*Primary Examiner*—Lenard A. Footland
*Attorney, Agent, or Firm*—Evenson, McKeown, Edwards & Lenahan, P.L.L.C.

[57] ABSTRACT

A rolling bearing unit with rotating speed detector is mounted to a hub and has a sensor comprising an axially magnetized permanent magnet 38 having first and second end faces, a pole piece 37 to which the first end face is abutted, a back yoke 39 to which the second end face is abutted to be closer to the hub 1, a coil 32 having a smaller in diameter than the hub and provided around the back yoke 39, so that the density of the magnetic flux flowing through the back yoke 39 changes as the phase changes in the cutouts 45 and 44 in the pole piece 37 and the tone wheel 13a.

12 Claims, 7 Drawing Sheets

ROLLING BEARING UNIT WITH ROTATING SPEED DETECTOR

This application is a continuation of application Ser. No. 08/544,792 filed on Nov. 7, 1995 abandoned.

FIELD OF THE INVENTION

This invention is related to a rolling bearing unit with rotating speed detector to support the vehicle wheels with respect to the suspension freely rotatably and to detect the rotating speed of the wheels.

DESCRIPTION OF THE PRIOR ART

In order that a vehicle wheel is supported with respect to the suspension freely rotatably while an anti-lock brake system (ABS) or a traction control system (TCS) is controlled, various constructions for a rolling bearing unit with rotating speed detector to detect rotating speed of the vehicle wheel are known up to now.

The rotating speed detector which is installed in the rolling bearing unit with rotating speed detector has a tone wheel which rotates with the vehicle wheel and a sensor which outputs a signal in proportion to the rotating speed of the tone wheel.

Various tone wheels and sensors are known up to now. The rotating speed detector of the passive type which uses the tone wheel made of magnetic material and changes the voltage generated in the coil of the sensor according to the rotation of the tone wheel is used widely, because it does not use expensive components.

The passive type rotating speed detector which comprises an annular sensor to make the output of the sensor larger as shown, for example, in HATSUMEI KYOKAI Technical Report Publication No. 94-16051 is known in the prior art.

Figure 6:
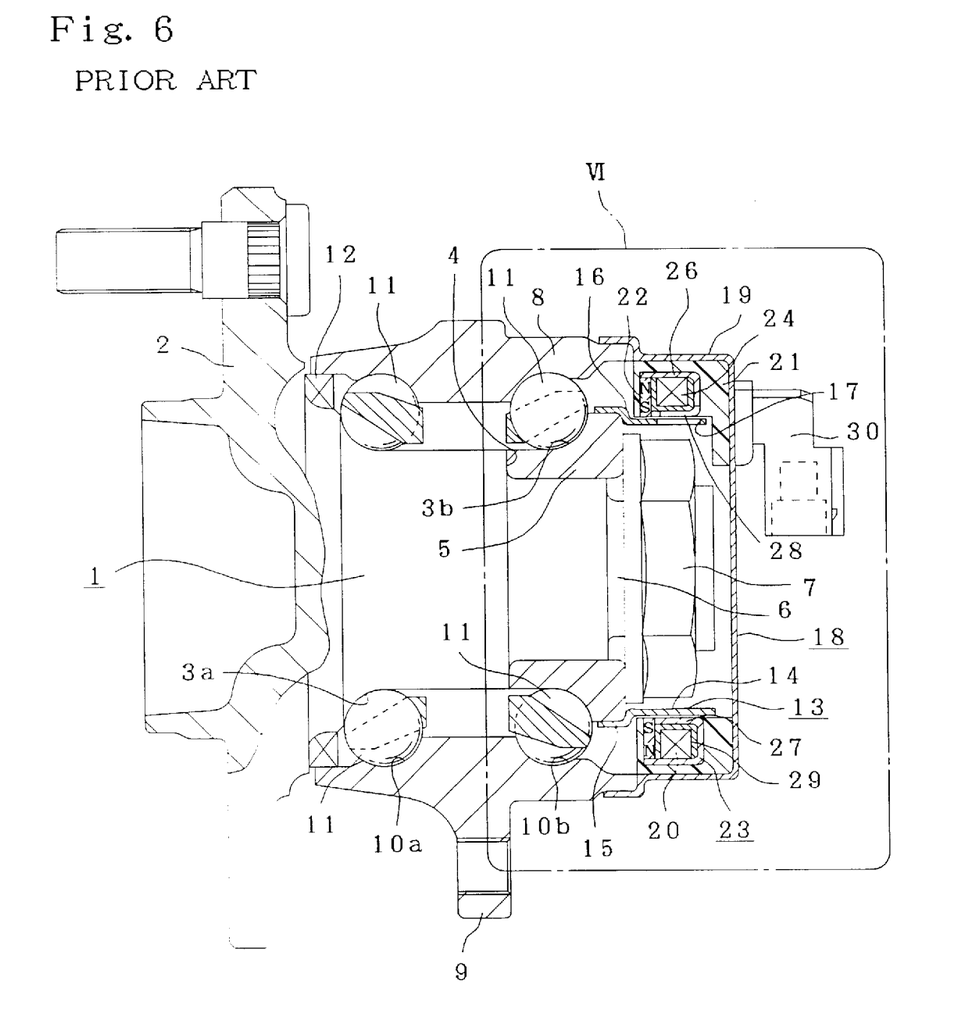
FIG. 6 is a cross-sectional view of part of a rolling bearing unit, showing a first example of a conventional construction.
Figure 7:
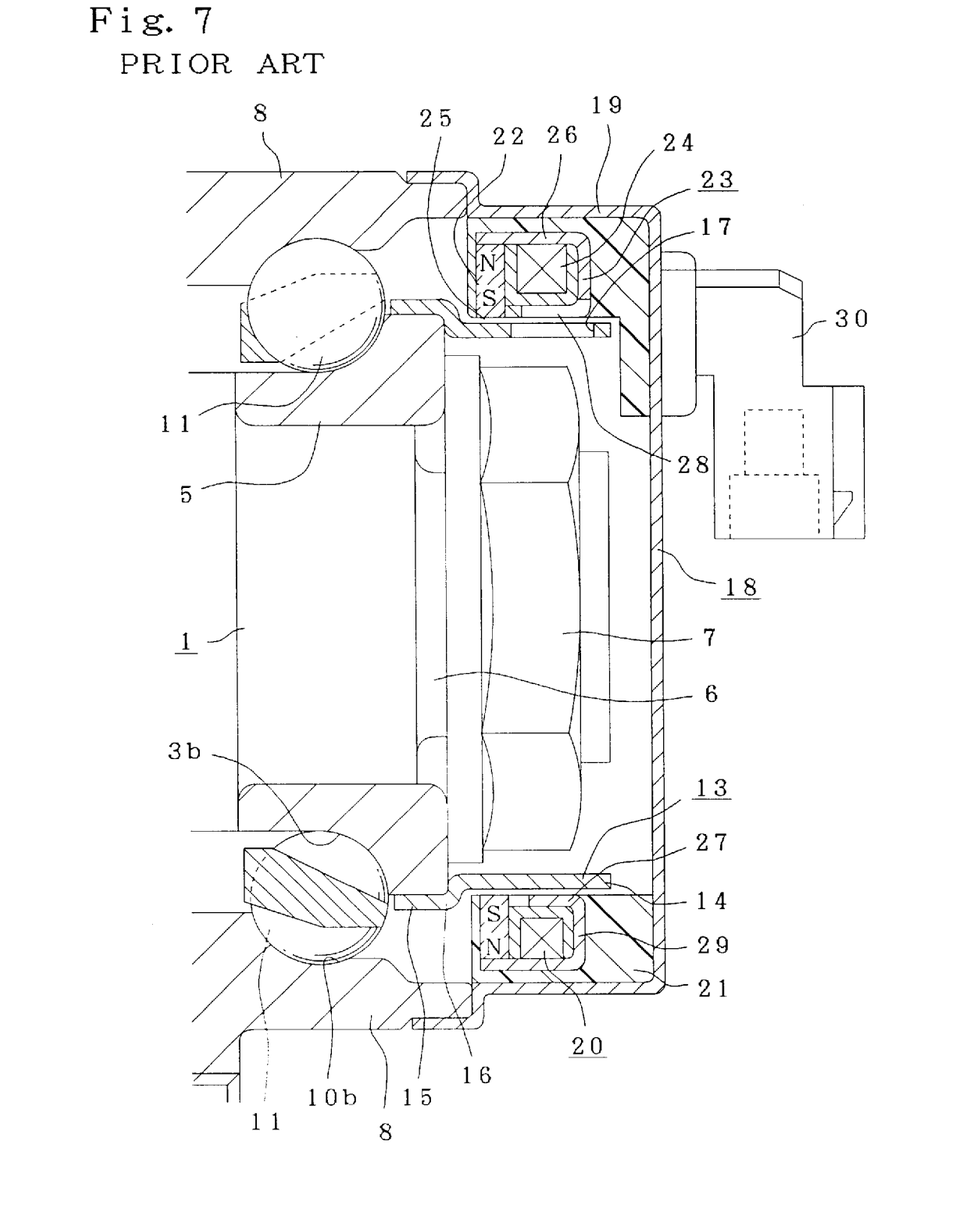
FIG. 7 is an enlarged view of the part VI of FIG. 6.

FIGS. 6 and 7 show the rolling bearing unit with rotating speed detector as disclosed in this Technical Report Publication.

A hub 1 has an axially outer end portion (the term "axially outer" in the specification means the outer side in a widthwise direction when installed in the vehicle; left in figures) which is formed with a flange 2 for wheel fixture on its outer peripheral face, a mid-portion which is formed with an inner ring raceway 3a and a step portion 4 on its outer peripheral face, and an axially inner end portion (the term "axially inner" means the center side in a widthwise direction when installed in the vehicle; right in figures) which has an inner ring member 5 provided on its cuter peripheral face.

The inner ring member 5 is formed with an inner ring raceway 3b and externally fitted to the outer peripheral face of the hub 1 with an axially outer end face thereof abutted against the step portion 4. A male-threaded portion 6 is formed on the axially inner end portion of the hub 1. The inner ring member 5 is fixed at a predetermined location on the outer peripheral face of the hub 1 by means of a nut 7 which is threaded onto the threaded portion 6 and tightened, thus constituting an inner ring assembly together with the hub 1.

There is also the case where, instead of directly forming the inner ring raceway 3a on the outer peripheral face of the hub 1, it is formed as an inner ring member (not shown) separate from the hub 1, and externally fitted to the hub 1 together with the inner ring member 5.

An outer ring member 8 located around the hub 1 has a mid-portion which is provided with an attachment portion 9 on an outer peripheral face thereof, for fixing the outer ring member 8 to a suspension unit.

An inner peripheral face of the outer ring member 8 is formed with respective outer ring raceways 10a, 10b opposite to the inner ring raceways 3a, 3b.

A plurality of rolling bodies 11 are respectively provided between the two inner ring raceways 3a, 3b and the pair of outer ring raceways 10a, 10b, so that the hub 1 is rotatable inside the outer ring member 8.

Figure 5:
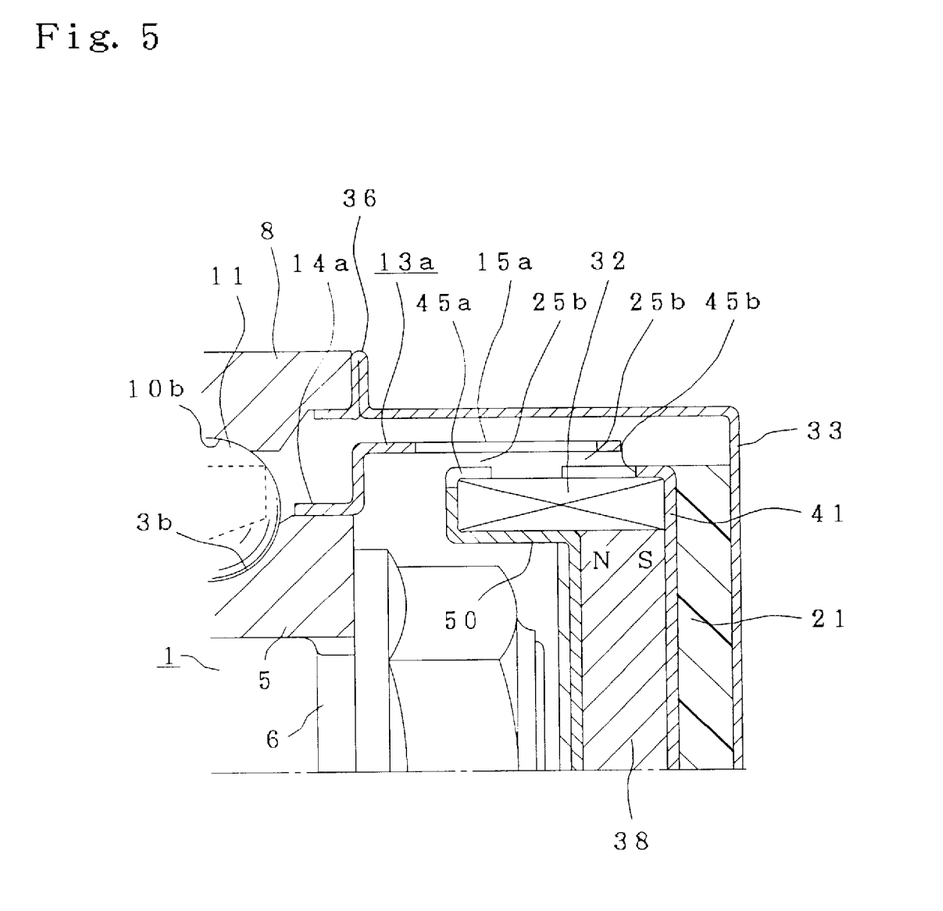
FIG. 5 is a partial cross sectional view of the rolling bearing unit incorporating another embodiment of the present invention.

In the case of a hub unit for heavy vehicles, tapered rollers are used for the rolling bodies instead of the balls shown FIGS. 5 and 6.

A seal ring 12 is fitted between the inner peripheral face at the axially outer end of the outer ring member 8, and the outer peripheral face of the hub 1, to cover the opening at axially outer end of the space in which the plurality of rolling bodies 11 are provided between the inner peripheral face of the outer ring member 8 and the outer peripheral face of the hub 1.

A tone wheel 13 has a base end portion (left end in FIGS. 5 and 6) which is externally fixed to a portion on an axially inner end of the inner ring member 5 which is spaced away from the inner ring raceway 3b.

The tone wheel 13 is made of magnetic metal plate such as steel plate, and is entirely cylindrical. The tone wheel 13 comprises a smaller diameter portion 14, a larger diameter portion 15 and a step portion 16 that are continuous and concentric with each other. This kind of tone wheel 13 is fixed to the inner ring member 5, such that the larger diameter portion 15 is fitted around the outer peripheral face on the axially inner end portion of the inner ring member 5, so that the step portion 16 comes in contact with the axially inner edge of the inner ring member 5. Therefore, the smaller diameter portion 14 is supported so that it is concentric with the inner ring member 5. There are several through-holes 17 formed around the smaller diameter portion 14 at equal intervals in the circumferential direction to form a first cut out section. Each of these holes 17 are identical and are rectangular shaped to extend in the axial direction (left and right in FIGS. 6 and 7).

An opening portion at the axially inner end portion of the outer ring member 8 is covered with a cover 18 made for example by deep drawing forming a metal sheet such as stainless steel plate, or aluminum alloy plate into the form of a bottomed cylinder.

A synthetic resin mass 21 in which is embedded an annular sensor 20 is fixed and retained within the cylindrical portion 19 of the cover 18. This sensor 20 comprises a permanent magnet 22, a pole piece 23 made of magnetic material such as steel plate, and a coil 24. By embedding the permanent magnet 22, pole piece 23 and coil 24 in the synthetic resin mass 21, the sensor 20 can be made generally annular.

Of these components which make up the sensor 20, the permanent magnet 22 is formed in a generally circular ring shape and magnetized, so that its magnetic orientation is in the radial direction. The inner peripheral face of this permanent magnet 22 is faced, through a small clearance 25, to the outer peripheral face of a base portion of the smaller diameter portion 14 of the tone wheel 13 where the holes 17 are not formed.

The pole piece 23 is formed so that it is entirely annular and has a radially outer cylindrical section 26 and a radially inner cylindrical section 27 connected to each other through a radial section in a substantially J-shaped cross section. The inner peripheral face on the axially outer end of the radially outer cylindrical section 26 of the pole piece 23 is very near or comes in contact with the outer peripheral face of the permanent magnet 22. Moreover, the inner peripheral face of the radially inner cylindrical section 27 of the pole piece 23 is faced to a portion of the tone wheel 13 where the holes 17 are formed.

Furthermore, a plurality of stationary notches 28 with an axial open end are formed in a second out out section around the radially inner cylindrical section 27 of the pole piece 23, so that they are located around the cylindrical section 27 circumferentially with the same pitch as the holes 17. The pitch is also referred to as center-angle pitch. Accordingly, the radially inner cylindrical section 27 is formed so that it is comb-toothed.

The coil 24 is formed by winding a conductive wire around a non-magnetic ring 29 so that it is annular shaped, and it is located on the inner peripheral side of the radially outer cylindrical section 26 of the pole piece 23. The electromotive force (emf) generated in this coil 24 is output from a connector 30 that protrudes from the outside surface of the cover 18.

When using the rolling bearing unit with rotating speed detector constructed as described above, as the tone wheel 13 rotates with the hub 1, the density of the magnetic flux flowing in the pole piece 23, which is faced to the tone wheel 13, changes, so that the voltage generated in the coil 24 changes at a frequency that is proportional to the rotational speed of the hub 1. The theory behind the change of voltage generated in the coil 24 due to the change in density of the magnetic flux flowing in the pole piece 23 is the same as that applied for rotating speed detector that have been widely used in the prior art. The reason that the density of the magnetic flux flowing in the pole piece 23 changes due to the rotation of the tone wheel 13 is described below.

The through-holes 17 formed around the tone wheel 13 and the notches 28 formed around the pole piece 23 have the same pitch, so that as the tone wheel 13 rotates, there are moments when they are all faced to each other at the same time. At the moment when these holes 17 and notches 28 are faced to each other, the magnetic column sections located between each pair of adjacent holes 17 and the magnetic tongue-shaped sections located between each pair of adjacent notches 28 are faced to each other through a small clearance 25 between them. When the magnetic column sections and magnetic tongue-shaped sections are faced to each other, the density of the magnetic flux flowing between the tone wheel 13 and the pole piece 23 is high.

In contrast to this state, when the holes 17 and notches 28 are half out of phase, the density of the magnetic flux flowing between the tone wheel 13 and the pole piece 23 becomes low. In other words, in this state, the holes 17 formed around the tone wheel 13 are faced to the tongue-shaped sections, while at the same time, the notches 28 formed around the pole piece 23 are faced to the column sections. When the column sections are faced to the notches 28 and the tongue-shaped sections are faced to the holes 17, there is a comparatively large gap or clearance between the tone wheel 13 and the pole piece 23 generally in the circumference. In this state, the density of the magnetic flux flowing between the tone wheel 13 and the pole piece 23 becomes low. As the result, the voltage generated in the aforementioned coil 24 changes proportionally with the rotational speed of the hub 1.

By using a sensor 20 like described above, the output voltage generated in the coil 24 changes with a frequency proportional to the rotational speed of the hub 1. There is an annular, limited space that necessarily exists in the opening end portion of the outer ring member 8. It is possible to utilize this annular limited space for installing the sensor 20 to make the output of the sensor 20 sufficiently large enough to reliably detect the rotational speed of the hub 1 rotating together with the vehicle wheel. The permanent magnet 22, the pole piece 23 and the coil 24, which make up the sensor 20 are all formed in an annular shape that entirely surrounds the tone wheel 13. Since the magnetic flux that comes from the permanent magnet 22 flows all the way around the pole piece 23, the amount of magnetic flux that flows generally through the pole piece 23 can be made sufficiently large enough. Thus the change in voltage on the coil 24 that corresponds to the change in density of the magnetic flux passing through the pole piece 23, can be made large.

The prior art rotating speed detector having the annular sensor 20 can have a larger output than those having the rod shaped senior. However, the degree of improvement of the output in the prior art rotating speed detector is smaller compared with the degree that the sensor 20 becomes large, so that the improvement in the rotating speed detector is further required. The reason that the degree of improvement of the output in the prior art rotating speed detector is small compared with the degree that the sensor 20 becomes large is described below.

In order to secure the output of the sensor 20, the number of windings of the coil 24 of the sensor 20 must be made large. On the other hand, as the length of the lead wire of the coil 24 is too long, the resistance of the lead wire becomes large, so that the output becomes small.

In case of the prior art construction as shown in FIGS. 6 and 7, the coil 24 is located on the outer peripheral side of the tone wheel 13, so that the length of a single winding is long. Accordingly, in order to secure the necessary number of windings, the total length of the lead wire is too long, so that the resistance becomes large and the output becomes small.

SUMMARY OF THE INVENTION

The rolling bearing unit with rotating speed detector of this invention is provided taking into consideration the situation explained above.

An object of the present invention is to provide a rolling bearing unit with rotating speed detector which comprises a non-rotating outer ring member having an opening end and an inner peripheral face formed with an outer raceway, a rotating inner ring member made of a magnetic material and having an end face and an outer peripheral face formed with an inner raceway, a plurality of rolling bodies provided between the outer raceway and the inner raceway, a cover securely fitted over the opening end of the outer ring member, an annular sensor supported inside the cover, and a rotating tone wheel made of a magnetic material and supported by the inner ring member, the cover comprising a cylinder portion and a bottom plate portion, the cylinder portion having an end opening portion and a base end portion securely fitted over the opening end of the outer ring member, and the bottom plate portion adapted to cover the end opening portion of the cylinder portion, the sensor comprising a magnetic pole piece having a central portion and supported by the bottom plate portion in a concentric relationship with the inner ring member, a permanent magnet axially magnetized for magnetic flux and having a first end face in magnetic orientation close to or in contact with the central portion of the pole piece and a second end face in magnetic orientation magnetically adjacent to the end face of the inner ring member, and a coil provided around a portion where the magnetic flux from the permanent magnet flows and having a smaller diameter than the tone wheel, the tone wheel having a first cutout section with a plurality of first cutouts circumferentially formed with a pitch, and the pole piece having a second cutout section with a plurality of second cutouts with the same pitch to that of the first cutouts.

A permanent magnet with no hole can be used due to the arrangement in which the permanent magnet is placed away from the shaft end of the inner ring member, so that the area of the magnetized face of the permanent magnet is enlarged to increase the sensor output.

DETAILED DESCRIPTION OF THE PREFERRED EMBODIMENTS

Like the prior art rolling bearing unit with rotating speed detector described above, the rolling bearing unit with rotating speed detector of this invention comprises a non-rotating outer ring member that has an outer raceway on its inner peripheral face, a rotating inner ring member that is made of a magnetic material and has an inner raceway on its outer peripheral face, a plurality of rolling bodies provided between the outer raceway and the inner raceway, a cover that is securely fitted over the opening end of the outer ring member, an annular sensor that is supported inside the cover, and a rotating tone wheel that is made of a magnetic material and is supported by the inner ring member.

The cover comprises a cylinder portion which has a base end portion securely fitted over the opening end of the outer ring member and an end opening portion and a bottom plate portion which covers the end opening portion of the cylinder portion.

The sensor comprises a pole piece which is made of magnetic material and is supported on the bottom plate portion in a concentric relationship with the inner ring member, a permanent magnet magnetized in the axial direction, and having an end face in the magnetized direction very close to or in contact with the central-portion of the pole piece and the other end in the magnetized direction magnetically adjacent to the end face of the inner ring member, and a coil which is wound around a portion where the magnetic flux originated from the permanent magnet flows.

A portion of the tone wheel and a portion of the pole piece are faced to each other with a small clearance between them.

A plurality of the first cutouts are formed on this portion of the tone wheel with equal interval in the circumferential direction. A plurality of the second cutouts are formed on this portion of the pole piece at the same pitch with that of the first cutouts.

What is meant by the term "cutout" in this specification includes through-holes, notches, slits, indentations, recesses etc.

With the rolling bearing unit with rotating speed detector according to the present invention constructed as described above, the voltage is generated in the coil of the sensor with the change of the density of the magnetic flux from the permanent magnet. The density of the magnetic flux is changed as the phase between the first cutouts and the second cutouts changes. The reason of this change is similar to the prior art apparatus mentioned above. In case of the rolling bearing unit with rotating speed detector of the present invention, the coil of the sensor is located radially inside the tone wheel, so that the diameter can be made small sufficiently. While the number of the windings of the coil is secured, the total length of the lead wire of the coil can be shortened compared with the prior art structure. As a result, the resistance of the lead wire becomes smaller so that the output of the sensor becomes larger.

Furthermore, the diameter of the portion where the tone wheel and the pole piece are faced with each other is large, so that the peripheral speed of this portion can be large sufficiently. Accordingly, the density of the magnetic flux changes rapidly as the phase between the first cutouts and the second cutouts changes. The diameters of the portions formed with the first and the second cutouts and provided with the biggest resistance against the flow of the magnetic flux are large, so that the area where the tone wheel and the pole piece are faced to each other becomes large. Accordingly the resistance for the flow of the magnetic flux can be small in the whole rotating speed detector as in the case of the prior art apparatus mentioned above.

In addition, since the permanent magnet is formed in a disk shape with no hole in it, the area of the magnetized face of the permanent magnet is enlarged, so that the output voltage of the sensor is increased.

The voltage generated into the coil is larger as the change speed of the magnetic flux is more rapid, and as the degree of change is larger. In case of the present invention, even if the resistance of the total lead wire is made small, the speed and amount of change can be secured as in the prior art apparatus. As a result, the output of the sensor can be made large.

Figure 1:
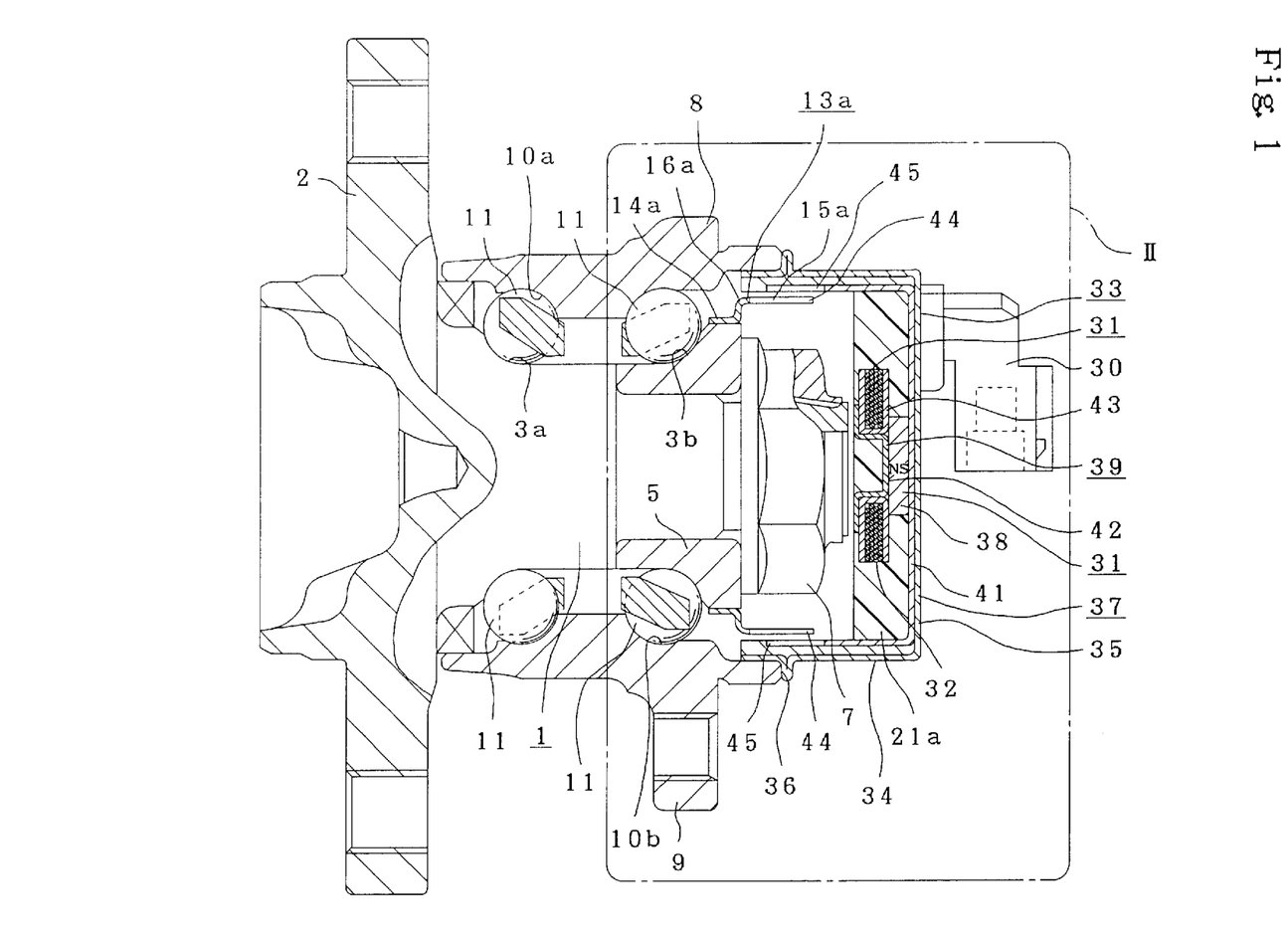
FIG. 1 is a partly cut-away, cross-sectional view of part of a rolling bearing unit, showing an embodiment of the present invention.
Figure 2:
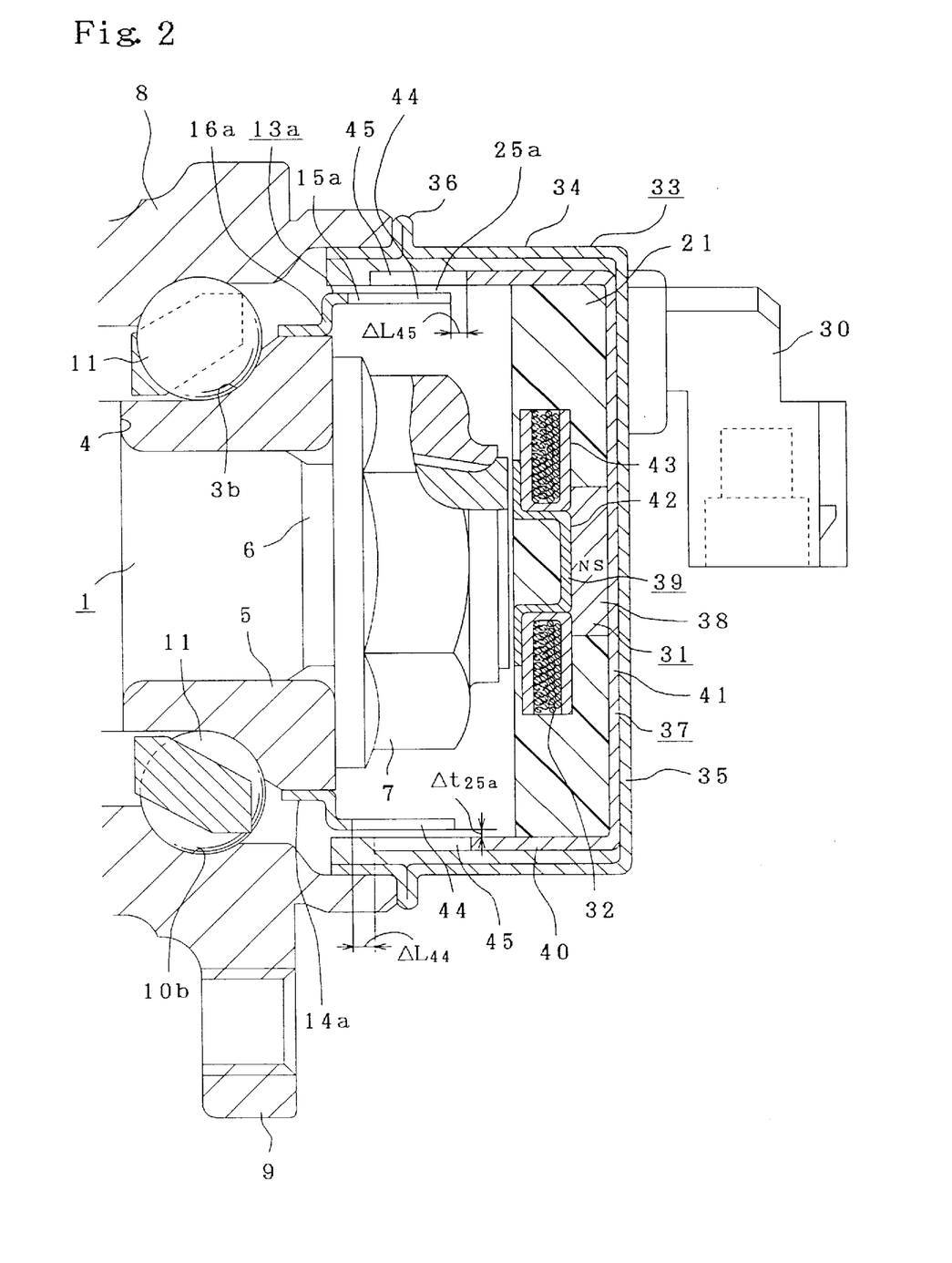
FIG. 2 is a partly cut-away, enlarged view of the part II of FIG. 1.

FIGS. 1 and 2 show a first embodiment of this invention. With the embodiment shown in FIGS. 1 and 2, the construction of the rotating speed detector is made different to that of the conventional detectors in that the diameter of the coil 32 can be made small so as to secure the number of the windings of the coil 32 of the sensor 31 end to shorten the total length of the lead wire.

Since the construction and the operation of the other portion are substantially the same as the above described prior art construction, the like reference mark is put in the like portion and the description of the parts duplicated in the conventional configuration is omitted or abbreviated. Therefore, with the following description, a detailed description of the feature of this invention is given.

The cover 33 is made of non-magnetic metal such as aluminum alloy plate, or stainless steel plate and the like into the form of a bottomed cylinder with a cylindrical portion 34 and a bottom plate portion 35. An outer peripheral face of a portion of the cylindrical portion 34 near the end opening (the left in FIGS. 1 and 2) is formed with a flanged portion 36. A base end of the cylindrical portion 34 which protrudes from the flanged portion 36 is internally fitted into the axially inner opening end of the outer ring member 8. An end opening portion of the cylindrical portion 34 is covered with the bottom plate portion 35.

The cover 33 may be comprised of a press-fitting portion of magnetic metal plate, and the remaining resin portion. The press-fitting portion is adapted to be fitted with the outer ring member 8. In other words, the bottom plate portion 35 may be made of resin, so that the stationary outer ring member 8 can be placed closer to the cover 33 to shorten the axial length, preventing the magnetic flux from leaking out.

The sensor 31 comprises the coil 32, the pole piece 37, the permanent magnet 38 and the back yoke 39. The pole piece 37 is made of magnetic metal sheet such as steel plate into the form of a bottomed cylinder with the cylindrical portion 40 and the bottom plate portion 41, and is supported on the bottom plate portion 35 of the cover 33 in a concentric relationship with the hub 1 of an inner ring assembly. The permanent magnet 38 is formed so that it is generally disc shaped and magnetized so that its magnetic orientation is in the axial direction (left/right direction in FIGS. 1 and 2). The axially inner end face in magnetized direction (right end face in FIGS. 1 and 2) of the permanent magnet 38 is in contact with the mid-portion of the bottom plate portion 41 of the pole piece 37.

The permanent magnet 38 of the present invention is small in a simple shape, so that the price of the permanent magnet 38 does not become high even if rare earth magnet is used. It should be noted that general ferrite magnets can be used instead of rare earth magnet for the permanent magnet 38 of the present invention. The magnet orientation should be in the axial orientation and either of the inner-outer positions between N-pole and S-pole is acceptable.

The back yoke 39 is made of magnetic metal sheet such as steel plate, and is formed so that it is entirely annular and has a hat-shaped cross section. That is to say, the back yoke 39 is formed with an annular portion and a circular protrusion 42 connected to the inner periphery of the annular portion. The axially inner face in magnetized direction (right end face of FIGS. 1 and 2) of the protrusion 42 is in contact with the axially outer end face in magnetized direction (left end face of FIGS. 1 and 2) of the permanent magnet 38. In this state, the axially outer face of the annular portion of the back yoke 39 is placed adjacent to the axially inner end faces of the hub 1 and the nut 7 of the inner ring assembly. As the result, the axially outer end face in magnetized direction of the permanent magnet 38 is magnetically adjacent to the axially inner end faces of the hub 1 and the nut 7.

Incidentally, as the area of the magnetized face of the permanent magnet is increased by enlarging its diameter, the output of the sensor is increased.

In this case, the back yoke 39 is replaced in the opposite direction, so that the annular portion is in contact with the permanent magnet 38 which the protrusion 42 is placed closer to the hub 1 and the nut 7.

Furthermore, the coil 32 is wound around the back yoke 39. With the embodiment shown in the figures, the holder 43 that is made of non-magnetic material such as synthetic resin or aluminum alloy in a generally annular shape and in a channel-shape in cross section, is fitted over the protrusion 42 of the back yoke 39, and the coil 32 is wound around the holder 43. With the embodiment shown in the figures, the outer diameter of the coil 32 is smaller than that of the nut 7. Accordingly, even if the number of the windings of the coil 32 increases sufficiently, the total length of the lead wire of the coil 32 does not become very large. Also, the components of the sensor 31 ere embedded in the synthetic resin 21, and this synthetic resin 21a is securely fitted inside the cover 33.

On the other hand, a tone wheel 13a of magnetic material has a base end portion which is externally fixed to an axially inner end portion of the inner ring member 5 of the inner ring assembly. The tone wheel 13a comprises a smaller diameter portion 14a, a larger diameter portion 15a and a step portion 16a that are continuous and concentric with each other. This kind of tone wheel 13a is fixed to the inner ring member 5, such that the smaller diameter portion 14a is fitted around the outer peripheral face on the axially inner end portion of the inner ring member 5. Therefore, the larger diameter portion 15a is supported so that it is concentric with the inner ring member 5.

The outer diameter of the larger diameter portion 15a is slightly smaller than the inner diameter of the cylindrical portion 40 of the pole piece 37. Accordingly, the outer peripheral face of the larger diameter portion 15a and the inner peripheral face of the cylindrical portion 40 are faced with each other through a small clearance 25a between them.

There are several cutouts 44 formed around the larger diameter portion 15a at equal intervals in the circumferential direction to form the first cut-out section. These cutouts 44 are identical and are rectangular shaped to extend in the axial direction (left/right direction in FIGS. 1 and 2).

Moreover, a plurality of stationary cutouts 45 are formed in the second cut-out section around the end portion of the cylindrical portion 40, so that they are located with the same pitch as that of the first cutouts 44.

The length dimension of these first and second cutouts 44, 45 in the axial direction is sufficiently large so that the cutouts 44, 45 can be faced with each other in their substantial areas. That is to say, the base end of the cutouts 44 formed on the tone wheel 13a is placed axially away by the amount of $\Delta L44$, from the edge of the cylindrical portion 40. Moreover, the base end of the cutouts 45 formed on the pole piece 37 is placed axially away by the amount of $\Delta L45$ from the edge of the tone wheel 13a. These lengths $\Delta L44$ and $\Delta L45$ are more than 1.5 times the thickness dimension $\Delta t25a$ of the small clearance 25a ($\Delta L44, \Delta L45 \geq 1.5 \Delta t25a$), where $\Delta t25a$=(the inner diameter of the cylindrical portion 40-the outer diameter of the larger diameter portion 15a)/2. This is so as to prevent that the magnetic flux bypasses the tongue shaped section located between each pair of adjacent cutouts 44, 45 in the circumferential direction between the tone wheel 13a and pole piece 37.

With the rolling bearing unit with rotating speed detector of the present invention constructed as described above, the magnetic flux flows from the N-pole of the permanent magnet 38 into the back yoke 39, from the back yoke 39 into the hub 1 and the nut 7 that are made of magnetic material respectively, from the hub 1 and the nut 7 into the inner ring member 5, from the inner ring member into the tone wheel 13a, from the tone wheel 13a into the pole piece 37, and then from the pole piece 37 into the S-pole of the permanent magnet 38.

As the density of the magnetic flux flowing in this kind of course changes due to the rotation of the hub 1, the voltage is generated in the coil 32 of the sensor 31 due to the change of the density of the magnetic flux flowing in the back yoke 39. The density of the magnetic flux flowing through the back yoke 39 changes due to the change of the phase between the cutouts 44 formed in the tone wheel 13a and the cutouts 45 formed in the pole piece 37.

Accordingly, the signal voltage generated in the coil 32 changes with a frequency proportional to the rotational speed of the vehicle wheel. Therefore, the signal voltage from the coil 32 is input to a controller (not shown) through the connector 30, so that an anti-lock braking system (ABS) or a traction control system (TCS) can be appropriately controlled. A portion of the bottom plate portion 41 of the pole piece 37 is formed with a through hole to pass the lead wire.

The theory behind the change of the density of the magnetic flux flowing in the back yoke 39 due to the rotation of the hub 1 is the same as that applied for rotating speed detectors that have been used in the prior art.

In case of the rolling bearing unit with rotating speed detector of the present invention, the coil 32 of the sensor 31 is located radially inside the tons wheel 13a, so that the diameter of the coil 32 can be sufficiently smaller e.g. then the diameter of the nut 7 with the embodiment shown in the figures. While the number of the windings of the coil 32 is secured, the total length of the lead wire of the coil 32 can be shortened compared with the prior art structure. As a result, the resistance of the lead wire becomes smaller, so that the output of the sensor 31 becomes larger.

Furthermore, the peripheral speed of the portion where the tone wheel 13a and the pole piece 37 are faced with each other can be large sufficiently, so that the density of the magnetic flux changes rapidly as the phase between the first cutouts 44 and the second cutouts 45 changes. The portions formed with the first and second cutouts 44, 45 and provided with the biggest resistance against the flow of the magnetic flux have a large diameter, so that the area where the outer peripheral face of the tone wheel 13a and the inner peripheral face of the pole piece 37 are faced with each other becomes large. This area is also the portion where the tongues between each pair of adjacent cutouts 44, 45 are faced with each other.

Accordingly, the resistance for the flow of the magnetic flux can be small in the whole rotating speed detector as in the case of the prior art apparatus mentioned above. The voltage generated into the coil is larger as the change speed of the magnetic flux is more rapid, and as the degree of change is larger. In case of present invention, even if the resistance of the total lead wire is made small, the speed and amount of change can be secured as in the prior art apparatus. In addition since the permanent magnet has no hole, the area of the magnetized face is increased enlarging its diameter, so that a great amount of magnetic flux can flow. As a result, the output of the sensor 31 can be made larger.

Figure 3:
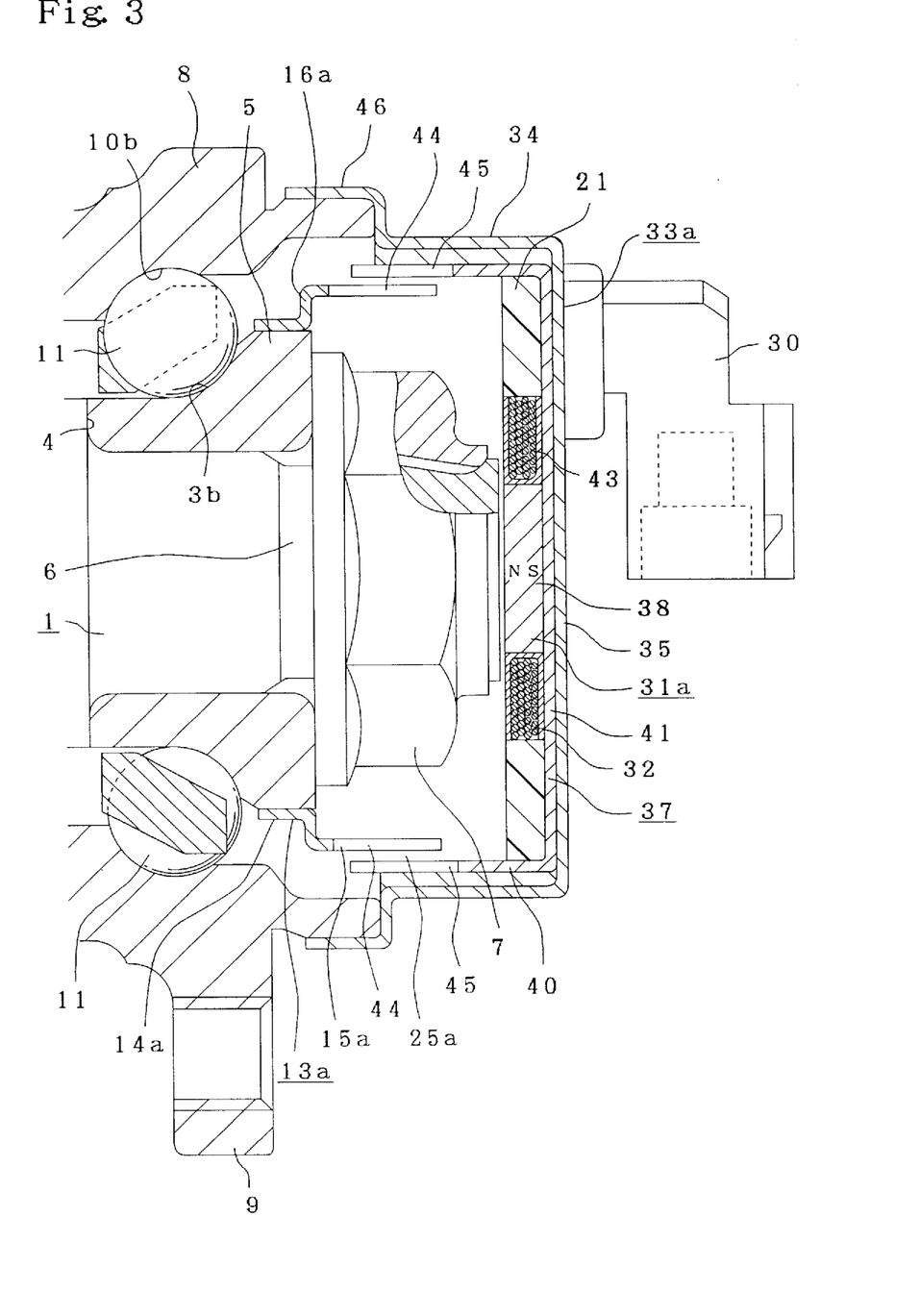
FIG. 3 is a partly cut-away, enlarged view of part of a rolling bearing unit, showing a second embodiment of the present invention.

FIG. 3 shows a second embodiment of this invention. With this embodiment, the axially outer end face in the magnetic orientation of the permanent magnet 38 of the sensor 31a (left end face in FIG. 3) is directly adjacent to the axially inner end face of the hub 1, and instead, the back yoke 39 incorporated in the first embodiment (shown in FIGS. 1 and 2) is omitted. Also, the holder 43 with the coil 32 wound is fitted over the outer peripheral face of the permanent magnet 38. The sensor 31a is composed in this way. So that the axial dimension can be smaller than that of the first embodiment. Furthermore, since the back yoke 39 is not necessary, the reduction of the cost can be attempted. The density of the magnetic flux flowing inside the permanent magnet 38 changes due to the change of the phase of the cutouts 44, 45, so that the voltage is generated in the coil 32 as in the case of the first embodiment.

With this embodiment, an engaging portion 46 is formed on the base end portion of the cylindrical portion 34 of the cover 33a and the diameter of the engaging portion 46 is larger than that of the cylindrical portion 34. The engaging portion 46 is securely fitted over the axially inner end portion of the outer ring member 8. The degree of the working of the engaging portion 46 is smaller than that of the brim portion 36 (shown in FIGS. 1 and 2) with the first embodiment and the work hardening is hard to occur, so that the annealing is unnecessary during press-forming. As a result, the reduction of the fabrication costs for the cover 33a is attempted. Other details of the construction and operation are substantially the same as for the abovementioned first embodiment.

Figure 4:
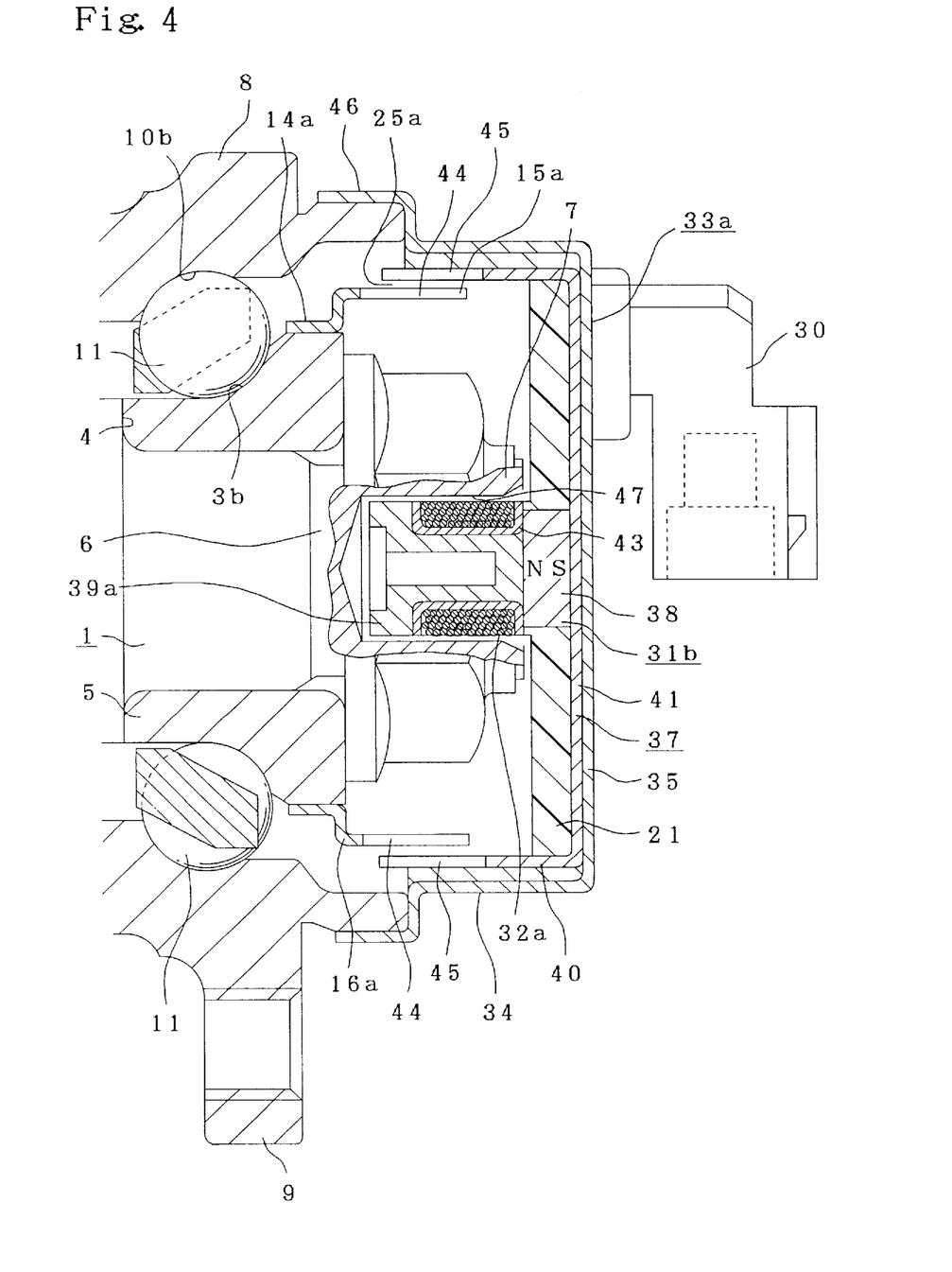
FIG. 4 is a partly cut-away, enlarged view of part of a rolling bearing unit, showing a third embodiment of the present invention.

FIG. 4 shows a third embodiment of the present invention. With this embodiment, the mid-portion of the end face of the hub 1 is formed with a hollow portion 47, so that the back yoke 39 and the coil 32a are inserted into the hollow portion 47.

The back yoke 39a is made from magnetic material by the sintering into the form of a bottomed cylinder, and the axially inner end face (right end face in FIG. 4) of the back yoke 39a is in contact with the axially outer end face of the permanent magnet 38 in the magnetic orientation, and the axially outer end face of the back yoke 39a is adjacent to the bottom face of the hollow portion 47. Moreover, the coil 32a is wound around the back yoke 39a in the area from the axially inner end face to the mid-portion thereof.

With this embodiment, the axial dimension can be small as in the case of the first embodiment. The diameter of the coil 32a is small and its axial dimension is long, so that the number of the winding of the coil 32a can be secured while the lead wire of the coil 32a can be shorter. Other details of the construction and operation are substantially the same as for the abovementioned second embodiment.

FIG. 5 shows another embodiment of the present invention with this embodiment, the permanent magnet 38 is enlarged in diameter.

Due to the construction and operation of the rolling bearing unit with rotating speed detector of the present invention as mentioned above, the following effects are obtained.

(1) The output of the sensor can be sufficiently large, so that the improvement of the reliability to detect the rotating speed of the vehicle wheel can be attempted.

(2) Due to the minimization of the diameter of the coil, the costs of materials can be saved and the weight on the vehicle wheel side of the spring that gives large influence to traveling performance and comfortableness for riders can be reduced.

(3) In the rolling bearing unit having an insufficient install space in the axial direction in construction, the annular sensor having a larger output can be set.

(4) Since the permanent magnet used has no hole, the area of the magnetized face can be increased comparing with the prior art structures, so that the output of the sensor is easily increased.

What is claimed is:

1. A rolling bearing unit with rotating speed detector comprising a non-rotating outer ring member having an opening end and an inner peripheral face formed with an outer raceway, a rotating inner ring member made of a magnetic material and having an end face and an outer peripheral face formed with an inner raceway, a plurality of rolling bodies provided between the outer raceway and the inner raceway, a cover securely fitted over the opening end of the outer ring member, an annular sensor supported inside the cover, and a rotating tone wheel made of a magnetic material and supported by the inner ring member, the cover comprising a cylinder portion and a bottom plate portion, the cylinder portion having an end opening portion and a base end portion securely fitted over the opening end of the outer ring member, and the bottom plate portion adapted to cover the end opening portion of the cylinder portion, the sensor comprising a magnetic pole piece having a central portion and supported by the bottom plate portion in a coaxial relationship with the inner ring member, a permanent magnet axially magnetized for magnetic flux and having a first end face in magnetic orientation close to the central portion of the pole piece and a second end face in magnetic orientation magnetically connected to the end face of the inner ring member so as to provide a closed magnetic circuit loop of lowest magnetic resistance, and a coil enclosed by said closed magnetic circuit loop and having a smaller diameter than the tone wheel, the tone wheel having a first cutout section with a plurality of first cutouts circumferentially formed with a pitch, and the pole piece having a second cutout section with a plurality of second cutouts with the same pitch to that of the first cutouts.

2. A rolling bearing unit according to claim 1, wherein the second end face of the permanent magnet is magnetically connected to the end face of the inner ring member via a nut which is connected to said inner ring member on a side facing said permanent magnet, said nut being made of magnetic material.

3. A rolling bearing unit according to claim 1, wherein the second end face of the permanent magnet is magnetically connected to the end face of the inner ring member via a yoke and a nut which is connected to said inner ring member on a side facing said permanent magnet, said yoke having a first portion which is positioned adjacent said permanent magnet, and a second portion which is positioned adjacent said nut, said yoke and said nut being made of magnetic material.

4. A rolling bearing unit with rotating speed detector comprising a non-rotating outer ring member having an opening end and an inner peripheral face formed with an outer raceway, a rotating inner ring member made of a magnetic material and having an end face and an outer peripheral face formed with an inner raceway, a plurality of rolling bodies provided between the outer raceway and the inner raceway, a cover securely fitted over the opening end of the outer ring member, an annular sensor supported inside the cover, and a rotating tone wheel made of a magnetic material and supported by the inner ring member, the cover provided with a cylinder portion having an end opening portion and a base end portion securely fitted over the opening end of the outer ring member, the sensor comprising a magnetic pole piece having a central portion and supported by the cover in a coaxial relationship with the inner ring member, a permanent magnet axially magnetized for magnetic flux and having a first end face in magnetic orientation close to the central portion of the pole piece and a second end face in magnetic orientation magnetically connected to the end face of the inner ring member so as to provide a closed magnetic circuit loop of lowest magnetic resistance, and a coil enclosed by said closed magnetic circuit loop and having a smaller diameter than the tone wheel, the tone wheel having a first cutout section with a plurality of first cutouts circumferentially formed with a pitch, and the pole piece having a second cutout section with a plurality of second cutouts with the same pitch to that of the first cutouts.

5. A rolling bearing unit with rotating speed detector comprising a non-rotating outer ring member having an opening end and an inner peripheral face formed with an outer raceway, a rotating inner ring member made of a magnetic material and having an end face and an outer peripheral face formed with an inner raceway, a plurality of rolling bodies provided between the outer raceway and the inner raceway, a cover securely fitted over the opening end of the outer ring member, an annular sensor supported inside the cover, and a rotating tone wheel made of a magnetic material and supported by the inner ring member, the cover provided with a cylinder portion having an end opening portion and a base end portion securely fitted over the opening end of the outer ring member, the sensor comprising a magnetic pole piece having a central portion and supported by the cover in a coaxial relationship with the inner ring member, a permanent magnet axially magnetized for magnetic flux and having a first end face in magnetic orientation in contact with the central portion of the pole piece and a second end face in magnetic orientation magnetically connected to the end face of the inner ring member so as to provide a closed magnetic circuit loop of lowest magnetic resistance, and a coil enclosed by said closed magnetic circuit loop and having a smaller diameter than the tone wheel, the tone wheel having a first cutout section with a plurality of first cutouts circumferentially formed with a pitch, and the pole piece having a second cutout section with a plurality of second cutouts with the same pitch to that of the first cutouts.

6. A rolling bearing unit with rotating speed detector comprising a non-rotating outer ring member having an opening end and an inner peripheral face formed with an outer raceway, a rotating inner ring member made of a magnetic material and having an end face and an outer peripheral face formed with an inner raceway, a plurality of rolling bodies provided between the outer raceway and the inner raceway, a cover securely fitted over the opening end of the outer ring member, an annular sensor supported inside the cover, and a rotating tone wheel made of a magnetic material and supported by the inner ring member, the cover provided with a cylinder portion having an end opening portion and a base end portion securely fitted over the opening end of the outer ring member, the sensor comprising at least one magnetic pole piece having a central portion and supported by the cover in a coaxial relationship with the inner ring member, a permanent magnet of a disc shape located spaced away from the inner ring member, magnetized for magnetic flux and having a first end face in magnetic orientation magnetically connected to the pole piece and a second end face in magnetic orientation magnetically connected to the tone wheel so as to provide a closed magnetic circuit loop of lowest magnetic resistance, and a coil enclosed by said closed magnetic circuit loop and having a smaller diameter than the tone wheel, the tone wheel having a first cutout section with a plurality of first cutouts circumferentially formed with a pitch, and at least one pole piece having a second cutout section with a plurality of second cutouts with the same pitch to that of the first cutouts.

7. A rolling bearing unit with rotating speed detector comprising a non-rotating outer ring member having an opening end and an inner peripheral face formed with an outer raceway, a rotating inner ring member made of a magnetic material and having an end face and an outer peripheral face formed with an inner raceway, a plurality of rolling bodies provided between the outer raceway and the inner raceway, a cover securely fitted over the opening end of the outer ring member, an annular sensor supported inside the cover, and a rotating tone wheel made of a magnetic material and supported by the inner ring member, the cover comprising a cylinder portion and a bottom plate portion, the cylinder portion having an end opening portion and a base end portion securely fitted over the opening end of the outer ring member, and the bottom plate portion adapted to cover the end opening portion of the cylinder portion, the sensor comprising a magnetic pole piece having a central portion and supported by the bottom plate portion in a coaxial relationship with the inner ring member, a permanent magnet axially magnetized for magnetic flux and having a first end face in magnetic orientation in contact with the central portion of the pole piece and a second end face in magnetic orientation magnetically connected to the end face of the inner ring member so as to provide a closed magnetic circuit loop of lowest magnetic resistance, and a coil enclosed by said closed magnetic circuit loop and having a smaller diameter than the tone wheel, the tone wheel having a first cutout section with a plurality of first cutouts circumferentially formed with a pitch, and the pole piece having a second cutout section with a plurality of second cutouts with the same pitch to that of the first cutouts.

8. A rolling bearing unit with rotating speed detector comprising a non-rotating outer ring member having an opening end and an inner peripheral face formed with an outer raceway, a rotating inner ring member made of a magnetic material and having an end face and an outer peripheral face formed with an inner raceway, a plurality of rolling bodies provided between the outer raceway and the inner raceway, a cover securely fitted over the opening end of the outer ring member, an annular sensor supported inside the cover, and a rotating tone wheel made of a magnetic material and supported by the inner ring member, the cover comprising a cylinder portion and a bottom plate portion, the cylinder portion having an end opening portion and a base end portion securely fitted over the opening end of the outer ring member, and the bottom plate portion adapted to cover the end opening portion of the cylinder portion, the sensor comprising at least one magnetic pole piece having a central portion and supported by the bottom plate portion in a coaxial relationship with the inner ring member, a permanent magnet of a disc shape located axially spaced from the inner ring member, magnetized for magnetic flux and having a first end face in magnetic orientation magnetically connected to the pole piece and a second end face in magnetic orientation magnetically connected to the tone wheel so as to provide a closed magnetic circuit loop of lowest magnetic resistance, and a coil enclosed by said closed magnetic circuit loop and having a smaller diameter than the tone wheel, the tone wheel having a first cutout section with a plurality of first cutouts circumferentially formed with a pitch, and at least one pole piece having a second cutout section with a plurality of second cutouts with the same pitch to that of the first cutouts.

9. A rolling bearing unit with rotating speed detector comprising a non-rotating outer ring member having an opening end and an inner peripheral face formed with an outer raceway, a rotating inner ring member made of magnetic material and having an end face and an outer peripheral face formed with an inner raceway, a plurality of rolling bodies provided between the outer raceway and the inner raceway, a cover securely fitted over the opening end of the outer ring member, an annular sensor supported inside the cover, and a rotating tone wheel made of magnetic material and supported by the inner ring member, the sensor comprising at least one magnetic pole piece positioned coaxially with the inner ring member, a permanent magnet in the form of a closed disk positioned coaxially with the inner ring member and axially magnetized for magnetic flux with a first axial end face in magnetic orientation positioned adjacent the pole piece and a second axial end face in magnetic orientation magnetically connected to the tone wheel so as to provide a closed magnetic circuit loop of lowest magnetic resistance, and a coil positioned adjacent said permanent magnet and enclosed by said closed magnetic circuit loop and having a smaller diameter than the tone wheel, the tone wheel having a first cutout section with a plurality of first cutouts circumferentially formed with a pitch, and the pole piece having a second cutout section with a plurality of second cutouts with the same pitch to that of the first cutouts.

10. A rolling bearing unit according to claim 9, wherein the second axial end face of the permanent magnet is magnetically connected to the tone wheel via a nut which is connected to said inner ring member on a side facing said permanent magnet and via said inner ring member, said nut being made of magnetic material.

11. A rolling bearing unit according to claim 9, wherein the second axial end face of the permanent magnet is magnetically connected to the tone wheel via a yoke, via a nut which connected to said inner ring member on a side facing said permanent magnet, and via said inner ring member, said yoke having a first portion which is positioned adjacent said permanent magnet, and a second portion which is positioned adjacent said nut, said yoke and said nut being made of magnetic material.

12. A rolling bearing unit according to claim 9, wherein said magnetic pole piece comprises a cylindrical portion positioned coaxially with the inner ring member and a circular plate portion enclosing an axial end of said cylindrical portion, said permanent magnet being positioned adjacent said circular plate portion.

* * * * *